United States Patent [19]

Romania

[11] 4,251,905

[45] Feb. 24, 1981

[54] LABEL ALIGNMENT APPLICATION DEVICE

[75] Inventor: Samuel R. Romania, Phoenixville, Pa.

[73] Assignee: Burroughs Corporation, Detroit, Mich.

[21] Appl. No.: 63,047

[22] Filed: Aug. 2, 1979

[51] Int. Cl.$^3$ .......................... B23P 19/04; B25B 7/00

[52] U.S. Cl. ...................................... 29/268; 81/5.1 R

[58] Field of Search ................. 29/238, 239, 268, 270; 81/5.1 R, 5.1 A, 5.1 B

[56] References Cited

U.S. PATENT DOCUMENTS

| | | | |
|---|---|---|---|
| 1,085,461 | 1/1914 | Michaelis | 29/268 X |
| 2,833,172 | 5/1958 | Williams | 81/5.1 R X |
| 3,177,567 | 4/1965 | Gehrman | 29/268 X |
| 3,602,971 | 9/1971 | Halstead | 81/5.1 R X |
| 3,659,331 | 5/1972 | Drake et al. | 29/268 |
| 4,170,125 | 10/1979 | Minka | 29/268 X |

*Primary Examiner*—James G. Smith

*Attorney, Agent, or Firm*—Francis A. Varallo; Leonard C. Brenner; Kevin R. Peterson

[57] ABSTRACT

A device is described for facilitating the application of an identifying label to a specific location on the surface of an integrated circuit package. In performing its function, the device permits an operator to lift a self-adhering label containing the desired indicia from its backing card while visually aligning it in the device. The operator then places one end of the integrated circuit package into the device, thereby effectively aligning the label with a desired location on the package surface so that it may be transferred thereto. The device finds particular application in an actual operative high density packaging system wherein the adjacent surfaces of a pair of integrated circuit packages are visible only through a narrow slot in a package hold-down member. Labels, such as those placed on generic PROM packages by operators immediately after programming, are thus precisely located so that their type designation can be seen through the aforementioned slot.

5 Claims, 8 Drawing Figures

LABEL ALIGNMENT APPLICATION DEVICE

CROSS REFERENCE TO RELATED APPLICATIONS

In application Ser. No. 513,283, now U.S. Pat. No. 3,946,276 for "Island Assembly Employing Cooling Means for High Density Integrated Circuit Packaging" by Robert E. Braun et al., there is described and claimed a high density packaging system in which leadless integrated circuit packages are installed in connectors. The packages themselves are clamped into the connectors through the use of a hold-down device described and claimed in application Ser. No. 513,282, now U.S. Pat. No. 3,942,854 for "Hold Down Device for Use in Electronic Systems Employing Integrated Circuits" by Peter P. Klein et al. To the extent that the present device facilitates the marking of the integrated circuits in the system taught in the above-identified patents, they are referenced herein. Both patents are assigned to the same assignee as the present application.

BACKGROUND OF THE INVENTION

In the referenced Braun et al. patent, a system is described which involves an "island" characterized as a plurality of integrated circuit packages installed in connectors, a cooling frame and an interconnection medium which supports the other elements. The hold-down device of the referenced Klein et al. patent applies a clamping force to the carriers or metallic heat sink members of the packages in order to insure electrical and thermal continuity respectively with the connector elements and the cooling frame. As noted in the last mentioned patent, it is a feature of the hold-down device that the packages under restraint may be identified as to type without their removal from the island assembly. To this end, the hold-down device includes a narrow elongated slot through which the type designation of the integrated circuit which has been placed on the upper surface of the heat sink member is visible at all times. In a system employing a large number of integrated circuits of different logic types, the ability to determine the location of each type while the packages are clamped in position and the system is operative, is of considerable importance for diagnostic and maintenance purposes.

Since the slot in the hold-down device is relatively narrow, the type indicia for the integrated circuit packages, which is an operative system comprises two adjacent rows each having four digits, must be precisely located on the package surface to be visible. While some integrated circuit packages may have their type designation placed on them at the time of manufacture according to a rigid specification, others are not capable of being completely identified at that time. For example, generic programmable read only memory (PROM) packages are supplied, and do not have a distinct type status until they are operator programmed for a particular purpose. Such programming is generally a pre-production requirement but may be necessary subsequently in a field environment. In either event, these packages must be immediately identified after programming to avoid future misplacement within the island assembly. Moreover, the PROM packages are often of the "split" variety, wherein two separate component packages are mounted side-by-side in a single connector. Since one hold-down device is used to clamp the pair of packages, the type designations of both packages must be completely visible through the slot. This imposes even tighter tolerances on the placement of the labels. The manual application of such labels, without mechanical assistance, is both tedious and time consuming. What is needed is a tool for assisting the operator in aligning and placing the labels on the packages. The device of the present invention provides a simple, low-cost, yet effective means of filling this need.

SUMMARY OF THE INVENTION

In accordance with the invention, a hand held pliers-like tool is provided to facilitate the alignment and application of identifying labels to integrated circuit packages.

The tool is comprised of a pair of pivotally mounted members. A first member of generally planar configuration has at one extremity, an upper jaw formed with a slot which serves as a viewing window. The second member has a lower jaw at its corresponding extremity, comprised of a pair of spaced-apart legs arranged to register the end of an integrated circuit package inserted therebetween. The upper surfaces of the legs of the lower jaw are adapted to contact the lower surface of the upper jaw during the operation of the device. Both the first and second members include finger-grip portions at their respective opposite extremities. The finger-grip portion of the first member is coplanar with that of its jaw, while that of the second member lies in a plane parallel to, but displaced from, the plane of the lower jaw. In the second member, the jaw and finger-grip portion are joined by a multi-angled section. The first member is pivotally disposed in a cut-out area of the last mentioned section. A compressed spring is interposed between the inner surfaces of the finger-grip portions of the respective members and serves to keep the jaws in a normally open position.

In operation the device of the present invention is used with self-adhering, card-mounted labels that include breakaway strips adapted to be peeled back to expose opposite ends of the label. The operator positions the label between the jaws of the tool by aligning the leading edge of the upper jaw with the edge of the label, taking care that the preprinted identification number on the label is visible in the viewing window. The underside of the viewing window includes a frame-like projection along its perimeter. Squeezing the finger-grip portions of the tool closes the jaws on the ends of the label causing the frame-like projection to contact the central portion of the label which bears the identifying numbers. Because of the projection, the portions of the label lying adjacent thereto are gently lifted from the card and the label as viewed edgewise assumes an arcuate configuration. This latter feature reduces the force needed to free the label from the card, thereby minimizing label distortion. Subsequently, it also assists in achieving a wrinkle-free attachment of the label to the package.

With the tool jaws still closed on the label, the operator inserts the end of the integrated circuit package between the legs of the lower jaw to a depth determined by stops on the legs. The package and label are now aligned with respect to each other. Application of slight finger pressure simultaneously to the package and the upper jaw, easily applies the label to the package surface and the finger-grip portions of the tool may be released to permit the spring to open the jaws. Additional finger pressure may then be applied to the label, if desired, to insure optimum adhesion of the entire label surface.

A peripheral advantage accruing from the use of the present device is that the labels are applied to the package without requiring that the operator handle the adhesive portions thereof, thereby minimizing the problem of non-adherence. Other features and advantages of the present invention will become apparent in the detailed description appearing hereinafter.

DESCRIPTION OF THE PREFERRED EMBODIMENT

Before proceeding with a description of the alignment and application tool of the present invention, it is believed helpful to review briefly the components of the island assembly described in the referenced patents. While the present device is not to be considered limited to use in this specific island assembly, it nevertheless finds particular application therein.

Figure 1:
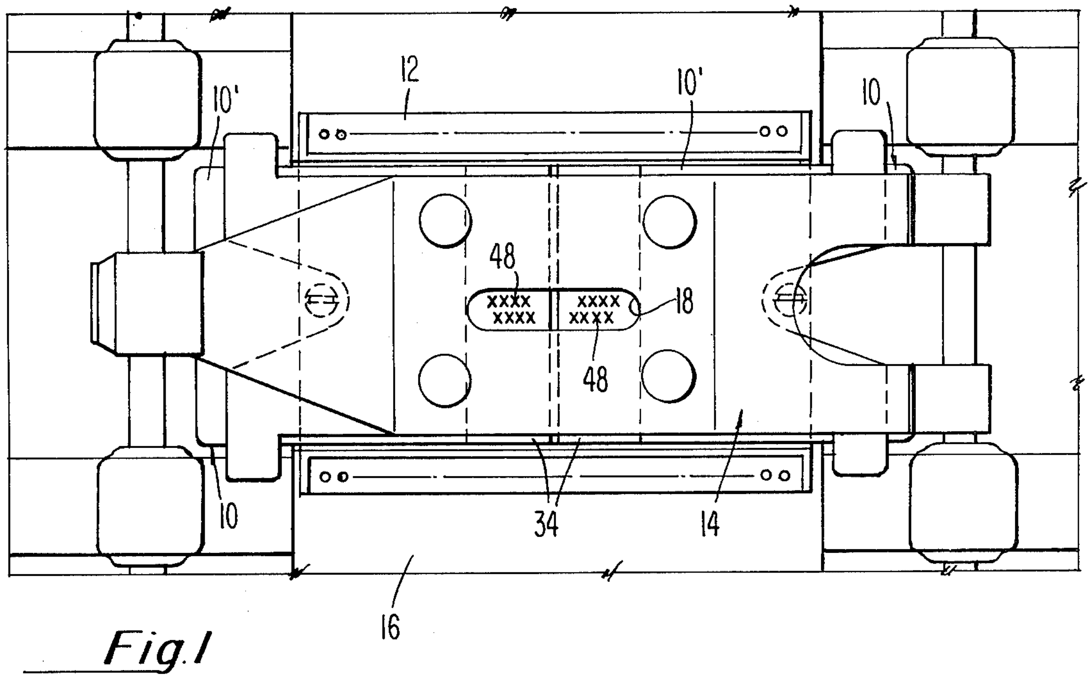
FIG. 1 is an enlarged plan view of a fragment of the island assembly described and claimed in the referenced patents.

FIG. 1 depicts in enlarged fashion, a single module of the island assembly showing the relationship of a "split" pair of leadless integrated circuit packages 10 installed in a connector 12, a hold-down device 14 for applying a clamping force to the packages 10 and an interconnection medium 16 for supporting the other components. In practice, a typical island may hold over one hundred connectors, and larger islands may be employed.

It is essential for diagnostic and maintenance purposes that the type of each integrated circuit package be visually ascertainable while the system is operative. Accordingly, the hold-down device 14 which bears against the carrier or metallic heat sink member 10' of the package 10 contains an elongated slot 18 which serves as a viewing window to disclose identifying markings 48 appearing on labels 34 (of the type seen in FIG. 6) and affixed to the package surface lying immediately below the slot. Space considerations within the island place severe limitations on the size of the slot 18; and the location of the slot relative to the package is fixed by system design. In an actual operative system, the slot 18 in the hold-down device 14 is approximately one-eighth inch in width and one-half inch in length. Moreover, in this system, each of the pair of split integrated circuit packages 10 requires two adjacent rows of four digit numbers, represented by the markings 48, to properly identify its type and function. As noted hereinbefore, such identification relating to generic PROM packages must of necessity, await the completion of the on-site programming function. As is apparent from FIG. 1, the packages 10 and their retaining hold-down device 14 cannot tolerate the positioning accuracy of a label 34 applied by hand without mechanical assistance. The tool 20 depicted in FIGS. 2–5 inclusive and described hereinafter facilitates the label application.

Figure 2:
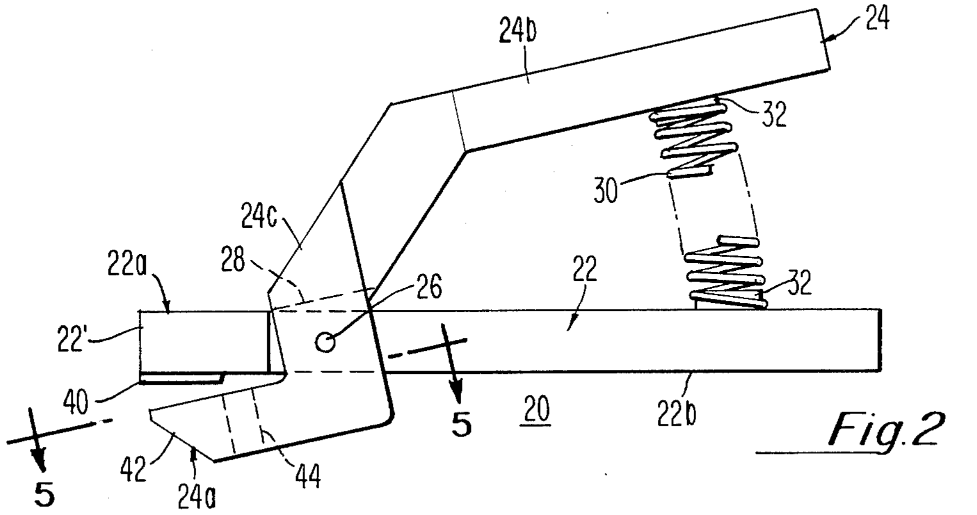
FIG. 2 is a side view of the label alignment application device of the present invention.
Figure 3:
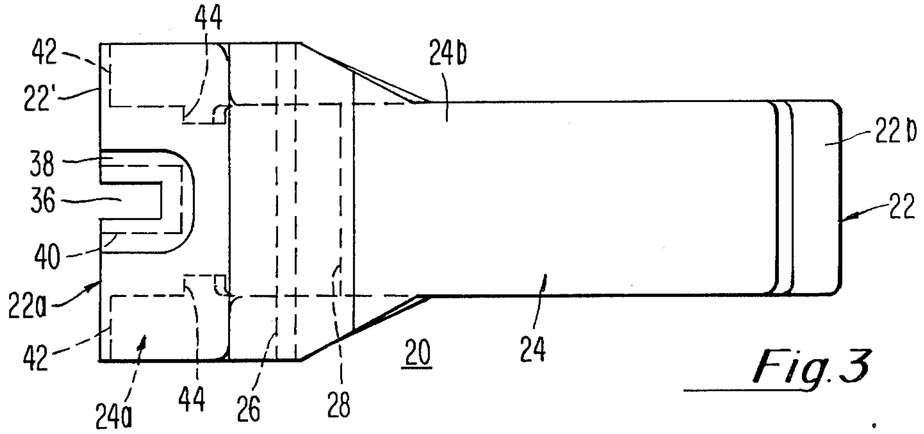
FIG. 3 is a plan view of the device.

FIGS. 2 and 3 are respective side and plan views of the device or tool 20 of the present invention. With reference to the latter FIGS., the tool 20 is comprised of a first member 22 and a second member 24 pivotally disposed with respect to each other by virtue of pin 26, resulting in a pliers-like action. The first member is generally planar and includes an upper jaw 22*a* at one extremity thereof. The second member 24 has a lower jaw 24*a* at a corresponding extremity. The opposite extremities of both the upper and lower members include respective handles or finger-grip portions 22*b* and 24*b*. In the second member, the finger-grip portion lies in a plane parallel to, but displaced from, the plane of the lower jaw 24*a*. A multi-angled section 24*c* containing the pivot pin 26 connects the lower jaw 24*a* with the finger-grip portion 24*b* of the second member 24. The first member 22 is pivotally mounted within a cut-out portion of the multi-angled section 24*c*. A compressed spring 30 is interposed between opposing surfaces of the finger grip portions 22*b* and 24*b* and is retained in place by protuberances 32 on the last mentioned surfaces. Spring 30 serves to keep the jaws in a normally open position.

Figure 4:
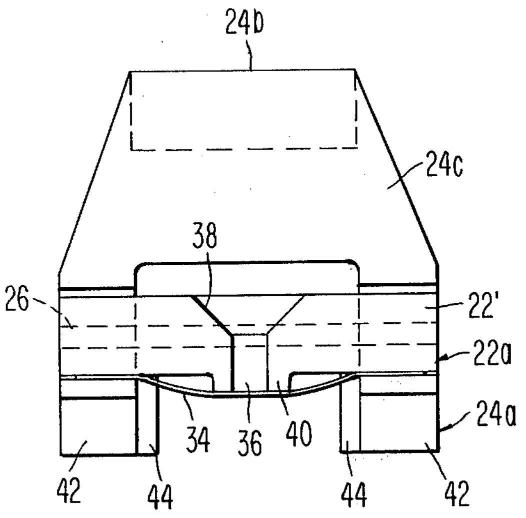
FIG. 4 is a front view of the device with its jaws closed upon a label and illustrating in particular the arcuate configuration assumed by the latter.

FIG. 4 is a front view of the device with the upper and lower jaws 22*a* and 24*a* closed upon a label 34.

Figure 5:
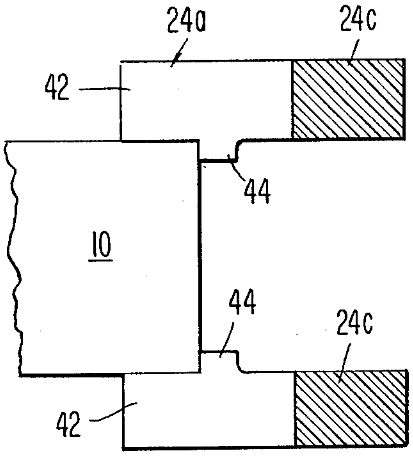
FIG. 5 is a section view of the device taken along lines 5—5 of FIG. 2 to better illustrate the registration of the integrated circuit package between the legs of the lower jaw.

FIG. 5 is a section view taken along the lines 5—5 of FIG. 2, showing the registration of the integrated circuit package 10.

With continued general reference to FIGS. 2 and 3 and additional reference to FIGS. 3 and 4, the upper jaw 22*a* includes a longitudinal slot 36 which extends from the outermost edge of the jaw, rearwardly a predetermined distance. The slot 36 serves as a viewing window as will be described hereinafter in connection with the operation of the tool. A beveled surface 38 is provided along the periphery of the slot at the outer surface of the upper jaw 22*a* to increase the field of view to the bottom of the slot 36. The inner surface of the upper jaw 22*a* includes a frame-like projection 40 along the periphery of the slot 36. FIG. 4 depicts the function of the projection 40 in causing the label 34 to assume an arcuate configuration, when the upper and lower jaws 22*a* and 24*a* are closed thereon. As seen in particular in FIG. 5, the lower jaw 24*a* is comprised of a pair of spaced apart legs 42, adapted to accommodate an integrated circuit package 10 therebetween. A pair of homologous ribs 44 formed on opposing surfaces of the legs 42 and oriented transversely to the longitudinal axes thereof, serve as stops to limit the insertion of the integrated circuit package 10.

Figure 6:
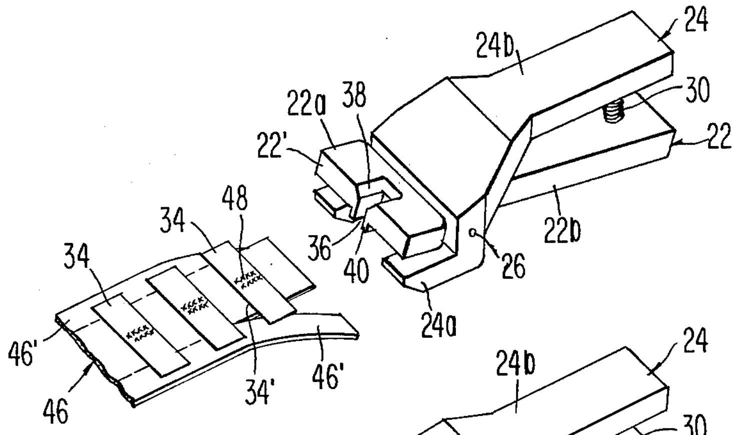
FIG. 6 is a pictorial illustration of the initial relationship of the device of the present invention to a strip of labels to be applied to respective integrated circuit packages.
Figure 7:
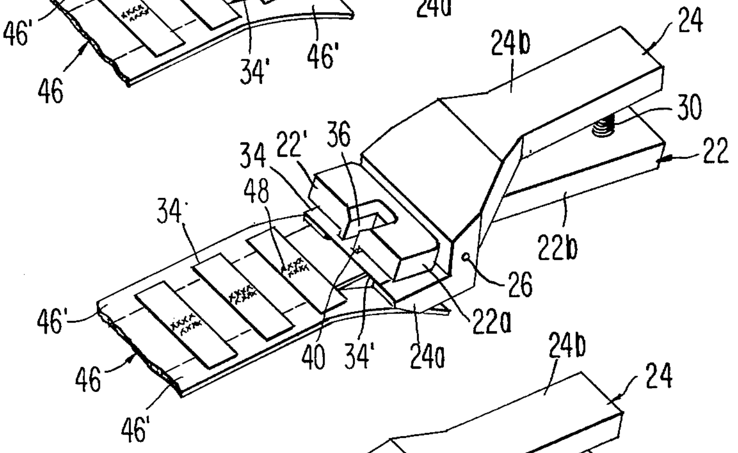
FIG. 7 further illustrates the alignment of the tool over the initial label, with its jaws in an open position.
Figure 8:
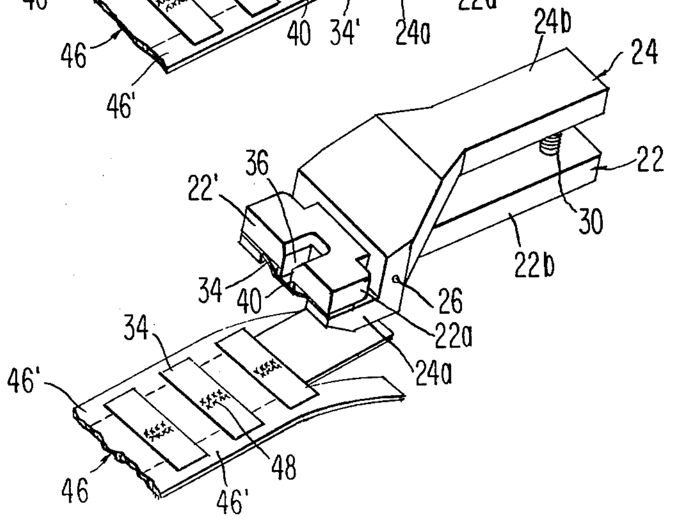
FIG. 8 illustrates the jaws closed on the label, the latter having been lifted from its backing card.

The operation of the tool 20 is illustrated pictorially in FIGS. 6 through 8.

In FIG. 6, a plurality of self-adhering labels 34 to be mounted on the surface of respective integrated circuit packages 10 are shown mounted on a card 46. The card includes breakaway strips 46' which are designed to be peeled back to expose both ends of the label 34, while leaving the central portion of the label attached to the card 46. Two adjacent rows of indicia 48 to identify the integrated circuit packages 10 are pre-printed on the labels 34. However, in lieu thereof, the operator may write a suitable identification thereon. The tool 20 is shown initially oriented by the operator with respect to the labels 34—the jaws 22*a* and 24*a* are in an open position.

FIG. 7 shows the tool as it is positioned by the operator over the label 34. The leading edge 22′ of the upper jaw 22*a* is aligned with an edge 34′ of the label and care is taken that the label indicia 48 are visible in the viewing window provided by the slot 36.

When this has been accomplished, the operator squeezes the finger-grip portions 22*b* and 24*b* of the tool 20, closing the jaws on the ends of the label. As seen in FIG. 8, (and also in FIG. 4), the frame-like projection 40 contacts the center of the label which bears the identifying indicia 48. Because of the projection 40, the portions of the label lying immediately adjacent thereto are gently lifted from the card 46 as the jaws are closed, thereby leaving only a small area of the label still attached to the card. Thus, the arcuate configuration assumed by the label 34 reduces the force which must be applied by the operator to completely free the label, and the chances of distortion of the label are minimized. The tool 20 is then withdrawn from the card 46, and the label 34 is lifted therefrom.

At this point, while the jaws 22*a* and 24*a* are maintained closed, the operator inserts the end of the integrated circuit package 10 between the legs 42 of the lower jaw 24*a* until it contacts the ribs 44. The package 10 is now accurately aligned with the label 34. Application of slight finger pressure simultaneously to the package 10 and the upper jaw 22*a* (in the area of the beveled surface 38), easily applies the label to the package surface in a wrinkle-free manner. While continuing to hold the package 10 and tool 20 in this manner, the finger-grip portions 22*b* and 24*b* are released to open the jaws. The package 10 is removed, the label 34 is trimmed to the desired length, and additional pressure is applied thereto to insure complete adhesion along its entire length.

The package 10 bearing the label 34 is then installed in the connector 12 and clamped by hold-down device 14 as illustrated in FIG. 1. The digits of indicia 48 are then visible across half of the slot 18 in the hold-down device 14. In effect, the slot 36 serving as a viewing window in the upper jaw 22*a* of the tool 20 is analogous to half of the slot 18 in the hold-down device. Alignment of the indicia 48 in the slot 36 by the operator during label application as described hereinbefore, insures that it will be visible through slot 18, when the package is placed in connector 12.

A second labeled package 10 may then be mounted in connector 12. The indicia 48 on this package will be visible through the remaining half of slot 18 in the hold-down device 14. It is apparent that if the indicia on the label applied to the second package had been oriented initially in the same direction as that applied to the first package, it will now appear rotated 180° when viewed through slot 18. This condition is not considered detrimental, and in fact serves to better visually differentiate the side-by-side indicia of the two split packages. On the other hand, two sets of labels having oppositely oriented indicia may be selectively employed in accordance with predetermined package placement in the island assembly, to cause both indicia to be similarly disposed.

In conclusion, there has been described a low-cost tool for efficiently and accurately positioning labels to be applied to the surface of integrated circuit packages or the like. Depending upon particular applications, changes and modifications of the device may be required. Such changes and modifications, insofar as they are not departures from the true scope of the invention, are intended to be covered by the following claims.

What is claimed is:

1. A device for facilitating the alignment and application of a label bearing identifying indicia to the surface of an object, particularly an integrated circuit package, comprising:

a first and a second member disposed with respect to each other in a pliers-like arrangement, said first member having a substantially planar configuration and including an upper jaw at one extremity and a finger-grip portion at the opposite extremity thereof, said second member including a lower jaw and a finger-grip portion at respective extremities thereof homologous to those of said first member, said lower jaw being comprised of a pair of spaced-apart legs and lying in a plane parallel to, but displaced from, the plane of said finger-grip portion of said second member, an intermediate angled section coupling said lower jaw and said last mentioned finger-grip portion to each other, said intermediate angled section having a cut-out region for pivotally mounting said first member, said upper jaw having a centrally located longitudinal slot commencing at the outermost surface of said one extremity, said slot serving as a viewing window for aligning said label in said device prior to its being clamped between said upper and lower jaws in response to pressure applied to the respective finger-grip portions of said first and second members, the inner surface of said upper jaw including a frame-like projection along the periphery of said slot, said frame-like projection extending below the planar label-supporting surface of said legs of said lower jaw and contacting the central portion of said label in response to the clamping of the opposite ends of said label between said upper jaw and said legs of said lower jaw, thereby causing said label to assume an arcuate configuration while being held in said device, said legs of said lower jaw being adapted to accommodate said integrated circuit package therebetween, said legs including a pair of homologous ribs formed on opposing surfaces thereof and oriented transversely to the longitudinal axes of the legs to provide stops for limiting the depth of insertion of said integrated circuit package within said legs, said integrated circuit package being registered with said label such that upon application, said label will be accurately positioned on the surface of said package.

2. A device as defined in claim 1 further characterized in that the outer surface of said upper jaw includes a beveled surface along the periphery of said slot to increase the field of view to the bottom of the slot and thereby facilitate the viewing of said identifying indicia on said label during its alignment within said device.

3. A device as defined in claim 2 further including a compressed spring interposed between the inner opposing surfaces of the finger-grip portions of said first and second members for keeping said upper and lower jaws in a normally open position.

4. A device as defined in claim 3 further characterized in that said intermediate angled section is multi-angled and is comprised of contiguous first and second portions, said first portions being coupled to said legs of said lower jaw and being oriented at a right angle thereto, and said second portion forming an acute angle with said first portion and being coupled to the finger-grip portion of said second member.

5. A device as defined in claim 4 further including a pivot, said first member having an aperture lying within the plane thereof and oriented transverse to its longitudinal axis for receiving said pivot, said pivot being located rearward of said upper jaw and having its opposite extremities supported by the structures of said first portion of said intermediate angled section lying on opposite sides of said cut-out region.

* * * * *